United States Patent
Baca et al.

(10) Patent No.: US 12,140,804 B2
(45) Date of Patent: Nov. 12, 2024

(54) CABLE ADAPTERS WITH INTEGRATED SEAL, OPTICAL CONNECTORS, OPTICAL CABLE ASSEMBLIES, AND METHODS OF FABRICATING THE SAME

(71) Applicant: CORNING RESEARCH & DEVELOPMENT CORPORATION, Corning, NY (US)

(72) Inventors: Adra Smith Baca, Lincolnton, NC (US); Micah Colen Isenhour, Lincolnton, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 18/387,961

(22) Filed: Nov. 8, 2023

(65) Prior Publication Data

US 2024/0069288 A1    Feb. 29, 2024

Related U.S. Application Data

(62) Division of application No. 17/329,831, filed on May 25, 2021, now Pat. No. 11,846,810.

(60) Provisional application No. 63/030,950, filed on May 28, 2020.

(51) Int. Cl.
  *G02B 6/36* (2006.01)
  *G02B 6/38* (2006.01)
(52) U.S. Cl.
  CPC ......... *G02B 6/3849* (2013.01); *G02B 6/3869* (2013.01); *G02B 6/3887* (2013.01); *G02B 6/3897* (2013.01)

(58) Field of Classification Search
  CPC .. G02B 6/3849; G02B 6/3869; G02B 6/3887; G02B 6/3897; G02B 6/36
  See application file for complete search history.

(56) References Cited

U.S. PATENT DOCUMENTS

| | | | |
|---|---|---|---|
| 7,090,406 B2 | 8/2006 | Melton et al. | |
| 7,113,679 B2 | 9/2006 | Melton et al. | |
| 7,277,614 B2 | 10/2007 | Cody et al. | |
| 8,439,577 B2 | 5/2013 | Jenkins | |
| 10,605,998 B2 * | 3/2020 | Rosson | G02B 6/3826 |
| 2008/0083592 A1 | 4/2008 | Mangano | |
| 2016/0349460 A1 * | 12/2016 | Collier | G02B 6/3849 |

(Continued)

OTHER PUBLICATIONS

"Fiber Access Terminals", Commscope, 7 pages.

(Continued)

*Primary Examiner* — Jennifer Doan
(74) *Attorney, Agent, or Firm* — Michael E. Carroll, Jr.

(57) ABSTRACT

Cable adapters, connector assemblies, and optical cable assemblies incorporating an integral seal are disclosed. According to one aspect, a cable adapter includes a first end, a second end, and a passageway extending between the first end and the second end. The cable adapter further includes a seal groove within a surface of the second end, at least one opening within the seal groove, wherein the at least one opening is fluidly coupled to the passageway, and a seal within the seal groove. The seal includes a sealing material disposed within the seal groove, the at least one opening, and along an interior surface of the passageway.

15 Claims, 9 Drawing Sheets

(56) References Cited

U.S. PATENT DOCUMENTS

2017/0102507 A1* 4/2017 Menguy .............. G02B 6/4248

OTHER PUBLICATIONS

"Hermetic Fiber Optic Connectors Radiall", 4 pages.
"Rugged Connector Sealing and Cable Assembly Systems", TE Connectivity, 6 pages.

* cited by examiner

CABLE ADAPTERS WITH INTEGRATED SEAL, OPTICAL CONNECTORS, OPTICAL CABLE ASSEMBLIES, AND METHODS OF FABRICATING THE SAME

CROSS REFERENCE TO RELATED APPLICATIONS

This application is a divisional of U.S. application Ser. No. 17/329,831 filed on May 25, 2021, which claims the benefit of priority under U.S. Provisional Application Ser. No. 63/030,950 filed on May 28, 2020, the content of which is relied upon and incorporated herein by reference in its entirety.

BACKGROUND

The present disclosure is directed to optical connectors and optical cable assemblies. More specifically, embodiments are directed to cable adapters with an integrated seal, and connector assemblies and optical cable assemblies incorporating the same. Embodiments are also directed to methods of fabricating optical connector assemblies and optical cable assemblies incorporating a cable adapter with an integrated seal.

Optical fiber is increasingly being used for a variety of applications, including but not limited to broadband voice, video, and data transmission. As bandwidth demands increase optical fiber is migrating toward subscribers in outdoor communication networks such as in fiber to the premises applications such as FTTx and the like. To address this need for making optical connections in communication networks for the outside the plant environment hardened fiber optic connectors were developed. One of the most commercially successful hardened fiber optic connectors is the OptiTap® male plug connector sold by Corning Cable Systems, LLC of Hickory, North Carolina, such as disclosed in U.S. Pat. Nos. 7,090,406 and 7,113,679 (the '406 and '679 patents) and incorporated herein by reference. The OptiTap® connector is a hardened male plug connector for terminating a cable that is configured for optical connection using a receptacle. As used herein, the term "hardened" describes a connector or receptacle port intended for making an environmentally sealed optical connection suitable for outdoor use, and the term "non-hardened" describes a connector or receptacle port that is not intended for making an environmentally sealed optical connection such as a SC connector.

Environmentally sealed connectors or receptacle ports require a seal between components of the connector or port (e.g., a housing) and the optical cable. Current hardened connectors and ports use a heat shrink tube. However, a heat shrink tube may introduce manufacturing complexities and may also introduce leakage points and opportunities for product failure.

SUMMARY

The disclosure is directed to optical connectors and optical cable assemblies having an integrated seal to environmentally seal hardened optical connectors and ports without the use of heat shrink tubing. The integrated seal provides an environmental seal between the components of the optical connector assembly and the optical cable. The integral seal is fabricated by a second overmolding process that disposes a sealing material in a sealing groove as well as an interior passageway.

One aspect of the disclosure is directed to a cable adapter including a first end, a second end, and a passageway extending between the first end and the second end. The cable adapter further includes a seal groove within a surface of the second end, at least one opening within the seal groove, wherein the at least one opening is fluidly coupled to the passageway, and a seal within the seal groove. The seal includes a sealing material disposed within the seal groove, the at least one opening, and along an interior surface of the passageway.

Another aspect of the disclosure is directed to an optical cable assembly including a cable adapter and an optical cable. The cable adapter includes a first end, a second end, and a passageway extending between the first end and the second end. The cable adapter further includes a seal groove within a surface of the second end, at least one opening within the seal groove, wherein the at least one opening is fluidly coupled to the passageway, and a seal within the seal groove, wherein the seal includes a sealing material disposed within the seal groove, the at least one opening, and along an interior surface of the passageway. The optical cable includes a jacket. The optical cable is disposed within the passageway, and the sealing material along the interior surface of the passageway contacts an outer surface of the jacket.

Still another aspect of the disclosure is directed to a method of fabricating an optical cable adapter including forming, by a first molding process, a cable adapter having a first end, a second end, and a passageway extending between the first end and the second end. The cable adapter further has a seal groove within a surface of the second end, and at least one opening within the seal groove. The at least one opening is fluidly coupled to the passageway. The method further includes forming, by a second molding process, a seal within the seal groove. The seal includes a sealing material disposed within the seal groove, the at least one opening, and along an interior surface of the passageway.

Still another aspect of the disclosure is directed to a method of fabricating an optical cable assembly including positioning an optical cable having a jacket surrounding at least one optical fiber within a passageway of a cable adapter. The cable adapter includes a first end, a second end, wherein the passageway extends between the first end and the second end, and a seal groove within a surface of the second end. The cable adapter further includes at least one opening within the seal groove, wherein the at least one opening is fluidly coupled to the passageway, a seal within the seal groove, wherein the seal comprises a sealing material disposed within the seal groove, the at least one opening, and along an interior surface of the passageway, and a slip device having a pull tab and a cable receiving portion. The cable receiving portion is disposed within the passageway and is adjacent an inner surface of the seal. The optical cable is positioned within the passageway such that the cable receiving portion is between a jacket of the optical cable and the inner surface of the seal. The method further includes pulling the pull tab of the slip device in a direction away from the cable adapter to remove the slip device from the cable adapter, thereby causing the inner surface of the seal to be adjacent to the jacket of the optical cable.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Figure 1:
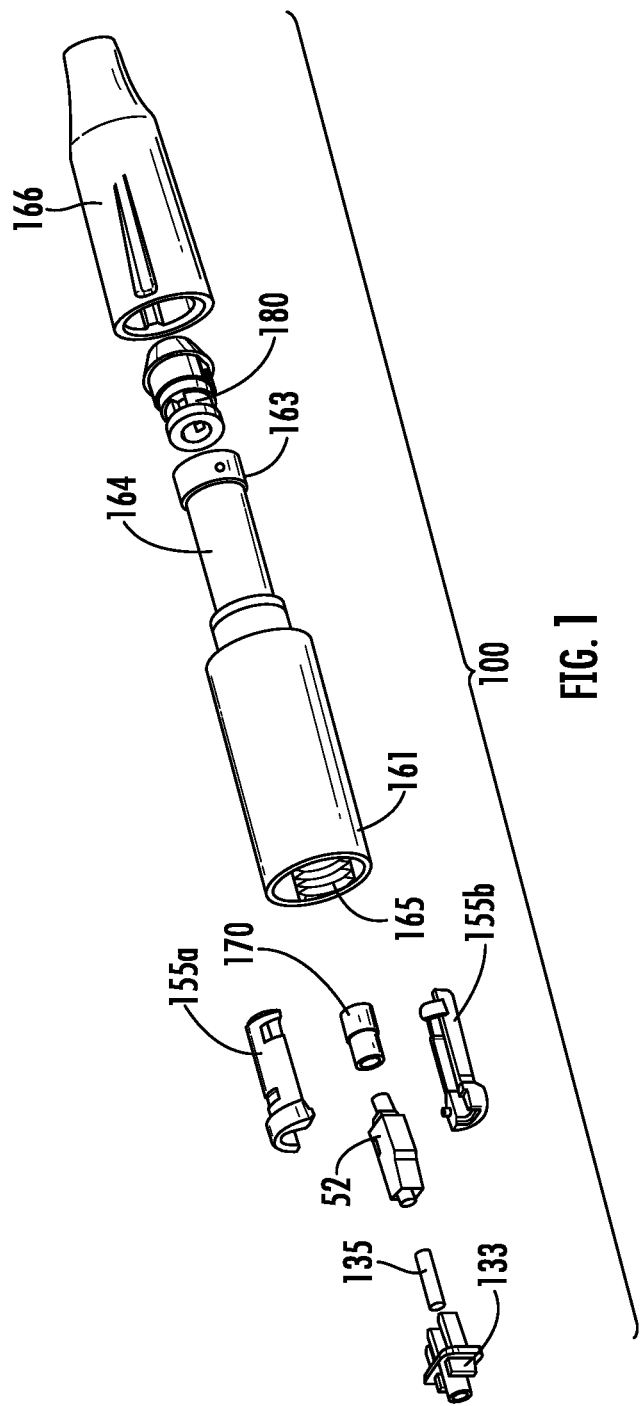
FIG. 1 is an exploded view of an example optical connector according to one or more embodiments described and illustrated herein.

Reference will now be made in detail to the embodiments of the disclosure, examples of which are illustrated in the accompanying drawings. Whenever possible, like reference numbers will be used to refer to like components or parts.

The fiber optic connectors and fiber optic cable assemblies described herein are suitable for making optical, electrical and/or optical-electrical connections to a mated hardened connector and/or hardened port. One of the most commercially successful hardened fiber optic connectors is the OptiTap® male plug connector sold by Corning Optical Communications, LLC of Charlotte, N.C., such as disclosed in U.S. Pat. Nos. 7,090,406 and 7,113,679 (the '406 and '679 patents) and incorporated herein by reference. The OptiTap® connector is a hardened male plug connector for terminating a cable that is configured for optical connection using a receptacle. As used herein, the term "hardened" describes a connector or receptacle port intended for making an environmentally sealed optical connection suitable for outdoor use, and the term "non-hardened" describes a connector or receptacle port that is not intended for making an environmentally sealed optical connection, such as a SC connector.

Although the concepts disclosed herein are explained with respect to OptiTap® connectors sold by Corning Optical Communications, LLC, the concepts disclosed may be used with other optical connectors hardened or not and are not limited to this particular optical connection. Further, the concepts disclosed herein may be implemented in male or female hardened optical connectors. Concepts disclosed herein may also be employed in other hardened connectors, such as electrical connectors.

The concepts of the disclosure advantageously allow robust and reliable optical connections for ferrule-based fiber optic connectors. Hardened optical connectors, such as OptiTap® optical connectors, are ruggedized for outdoor applications so that they may operate in a wide variety of environmental conditions. As such, the internal components of the optical connector should be sealed from the environment to prevent moisture, dust and debris from entering the optical connector, which may cause optical loss between mated optical connectors.

Present hardened optical connectors seal the optical connector from the environment by application of a heat shrink device. In some examples, a heat shrink tube is disposed around an internal component of the optical connector, such as a cable adapter, and the optical cable. Heat is then locally applied around the heat shrink tube to shrink it so that it is tightly disposed around the internal component and the optical cable. The heat shrink tube seals the optical cable with respect to the internal component, and the internal component with respect to an outer housing that is tightly fit around the internal component. Thus, the heat shrink prevents moisture, dust, and debris from entering the interior of the hardened optical cable.

However, the heat shrink tube presents several disadvantages. As one example, the addition of a heat application stage in the manufacturing process of the hardened optical connectors adds additional time, cost and complexity to the manufacturing process. As another example, consistent activation of the heat shrink tube has been found to be difficult, which may lead to reduced yield and product failures. Further, additional substances, such as adhesive linings in the heat shrink tube, may reflow during the heat application process and create leakage paths or cause the heat shrink tube to slide off of the cable.

As described in more detail below, embodiments of the present disclosure are directed to optical connectors and optical cable assemblies having improved environmental sealing capability that do not rely on heat shrink tubing. Particularly, embodiments described herein may include a cable adapter having an integral sealing element that may replace heat shrink tubing to seal the hardened optical cable assembly from the environment. The cable adapters described herein may eliminate the manufacturing and performance issues caused by the use of heat shrink tubing.

Various embodiments of cable adapters, connector assemblies, optical cable assemblies, methods of fabricating cable adapters, and methods of fabricating optical cable assemblies are described in detail below.

Referring now to FIG. 1, a non-limiting example optical connector 100 for installation in an optical cable assembly is illustrated. It should be understood that the optical connector 100 illustrated by FIG. 1 is provided for illustrative purposes, and the cable adapters described herein may be used in other types and styles of optical connector and cable assemblies.

The example optical connector 100 comprises a connector assembly 52, connector sleeve assembly 136, a first shell 155a, a second shell 155b, and a female coupling housing 164. Connector sleeve assembly 136 comprises a housing 133 and a ferrule sleeve 135. Housing 133 comprises one or more features configured for attaching to connector assembly 52 and a passageway between a first end and a second end of the housing 133. The optical connector 100 also comprise a cable adapter 180 having an integrated seal, and a boot 166. When assembled, the ferrule 52b of the connector assembly 52 is at least partially disposed in the ferrule sleeve 135, and the cable adapter 180 is at least partially disposed within the female coupling housing 164 and the boot.

Figure 2A:
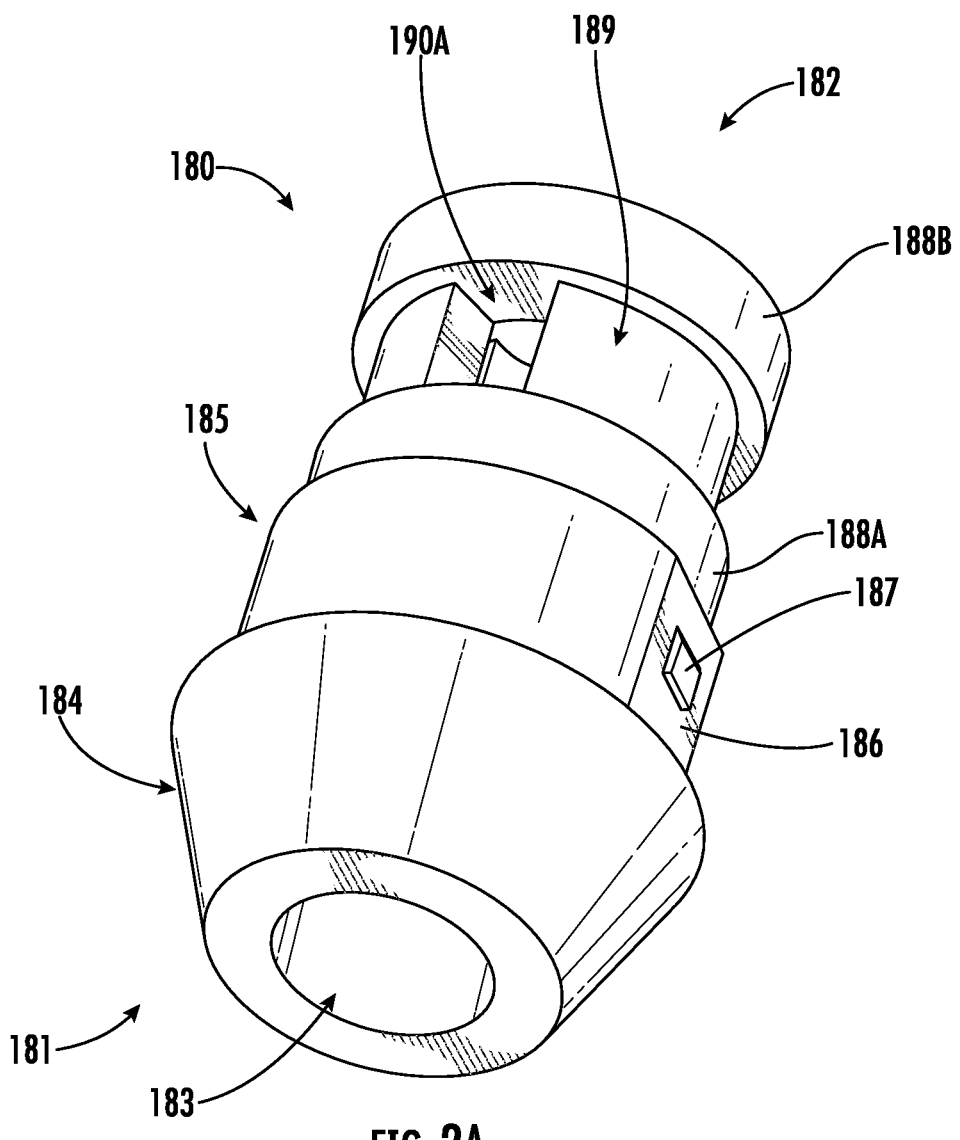
FIG. 2A is a rear perspective view of an example cable adapter prior to fabrication of a seal according to one or more embodiments described and illustrated herein.
Figure 2B:
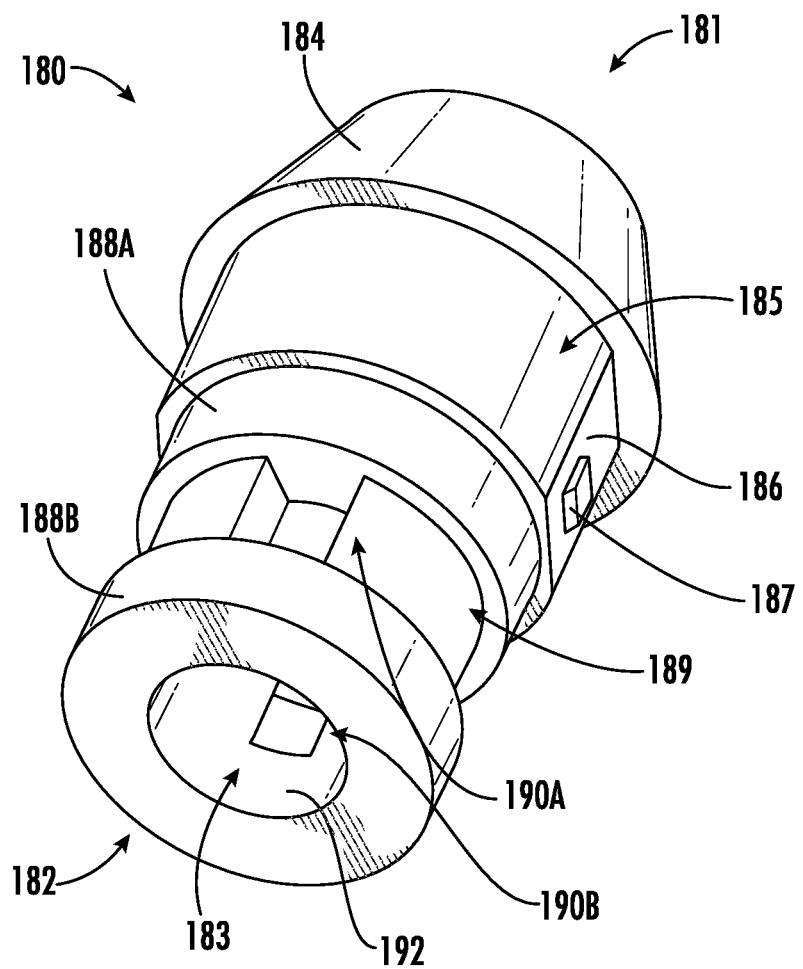
FIG. 2B is a front perspective view of the example cable adapter of FIG. 2A.

Referring now to FIGS. 2A and 2B, a non-limiting example of a cable adapter 180 without an integral seal is illustrated. FIG. 2A is a rear perspective view of the cable adapter 180, and FIG. 2B is a front view of the cable adapter 180. It should be understood that embodiments are not limited to the shape and configuration of the cable adapter 180 illustrated by FIGS. 2A and 2B, and that other variations are possible.

The cable adapter 180 may be fabricated from any suitable material, such as moldable polymer materials. The cable adapter 180 comprises a body having a first end 181 and a second end 182, with a passageway 183 for an optical cable (or an electrical cable in electrical cable assemblies) extending between the first end 181 and the second end 182. The example cable adapter 180 is cylindrical in shape having a cylindrical passageway 183 for receiving an optical cable that is circular in cross section. However, the cable adapter 180 and its passageway may take on other shapes to accommodate other types of optical cables (e.g., flat optical cables, elliptical optical cables, and the like). The first end 181 may have a tapered surface 184 that narrowly tapers in a direction from the middle of the cable adapter 180 to the end of the second end 182. This tapered surface 184 may assist in installing the boot 166 over the cable adapter 180, for example. However, it should be understood that the tapered surface 184 may not be present in some embodiments.

The illustrated cable adapter 180 has a middle segment 185 disposed between the first end 181 and the second end 182. As a non-limiting example, the middle segment 185 is generally cylindrical in shape while having a planar keyed surface 186 with an engagement feature 187 extending therefrom. The keyed surface 186 and the engagement feature 187 may cooperate with corresponding features of the female coupling housing 164 (or other housing depending on the type of connector) to engage the cable adapter 180 with the female coupling housing 164. For example, an interior surface (not shown) of the female coupling housing 164 may include a corresponding planar surface and a recess for receiving the engagement feature 187.

The second end 182 comprises a seal groove 189 disposed between an inner segment 188A and an outer segment 188B. As shown in FIGS. 2A and 2B, the inner segment 188A and the outer segment 188B have an outer diameter that is smaller than the largest diameter of the first end 181 and the diameter of the middle segment to both mate with features of the female coupling housing 164 and provide clearance for the seal 191, as shown in FIGS. 3A and 3B and described in more detail below.

The seal groove 189 has a diameter that is smaller than the diameter of the inner segment 188A and the outer segment 188B to accommodate the seal 191. The example seal groove 189 is disposed around the entire circumference of the second end 182. The seal groove 189 further comprises one or more openings that extend into the passageway 183. FIGS. 2A and 2B illustrate a first opening 190A and a second opening 190B radially opposite the first opening 190B; however, more or fewer openings may be provided, and the openings need not be radially opposite from one another. As described in more detail below, the one or more openings fluidly couple the seal groove 189 to the passageway 183 to form the seal 191 therein.

Figure 3A:
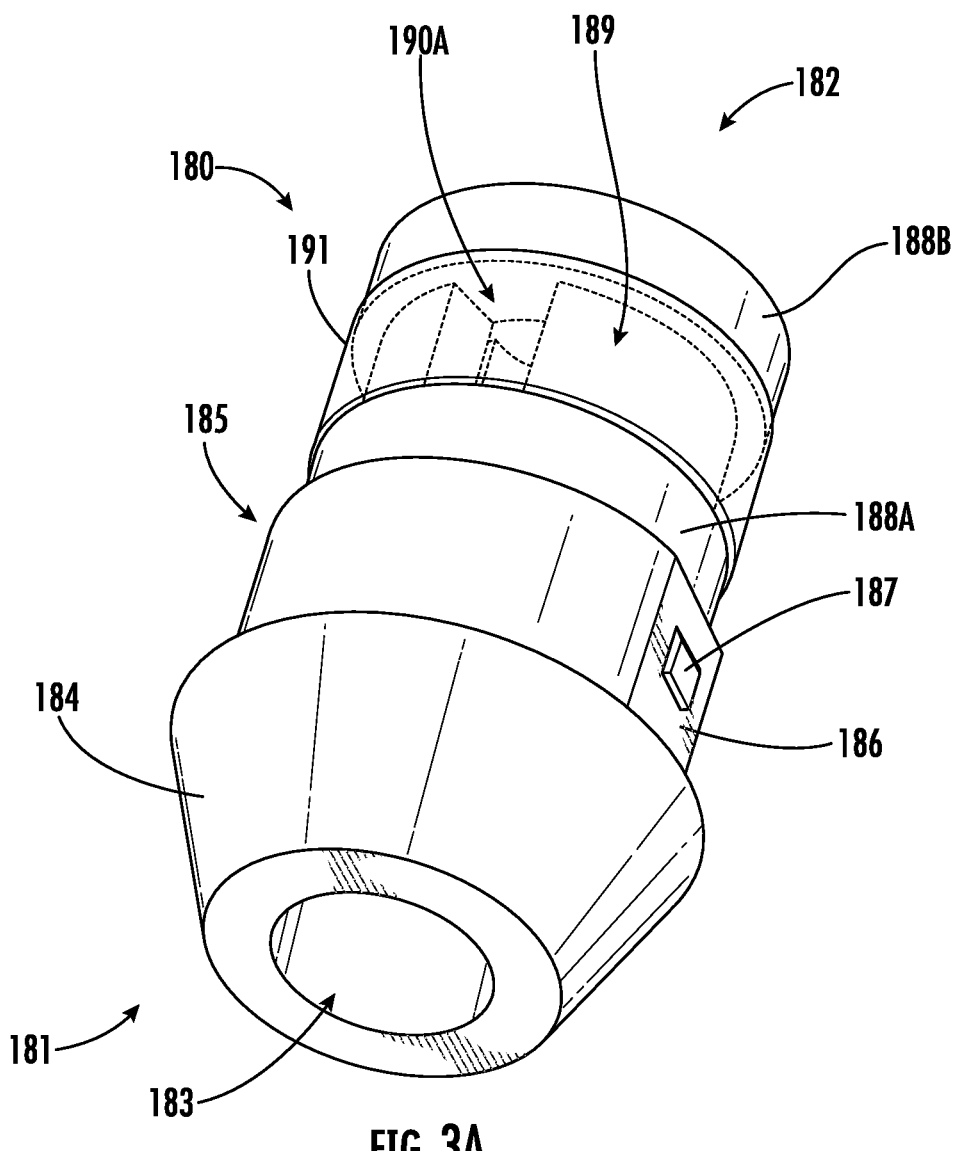
FIG. 3A is a rear perspective view of the example cable adapter shown in FIG. 2A after fabrication of a seal according to one or more embodiments described and illustrated herein.
Figure 3B:
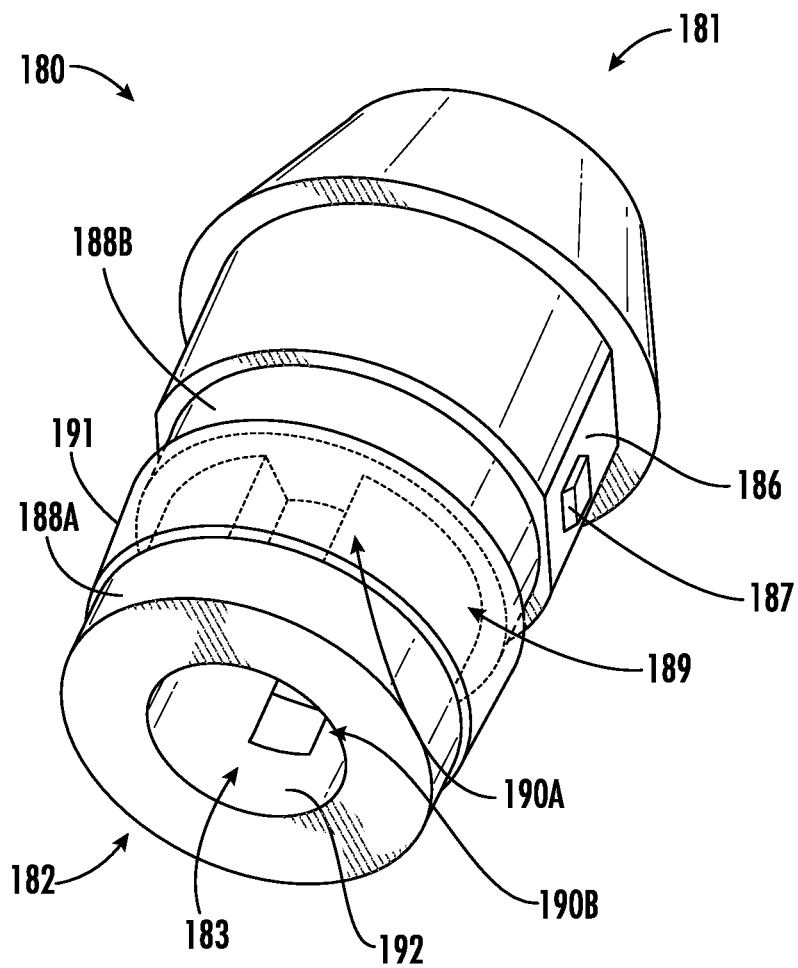
FIG. 3B is a front perspective view of the example cable adapter shown in FIG. 3A.

FIGS. 3A and 3B provide similar views of the cable adapter 180 as FIGS. 2A and 3B but with the seal 191 disposed within the seal groove 189. The seal 191 is made from a moldable, pliable seal material capable of being overmolded on the body of the cable adapter 180. The seal 191 should have a modulus of elasticity sufficient enough to provide a seal between the body of the cable adapter 180 and the optical cable 200 (see FIG. 4) (or electrical cable or other cable) and between the body of the cable adapter 180 and the female coupling housing 164 (or other type of housing). As non-limiting examples, the seal 191 has a hardness of less than or equal to Shore A 40, less than or equal to Shore A 30, less than or equal to Shore A 20, less than or equal to Shore OO 25. As non-limiting examples, the compression set for the seal 191 is less than or equal to 20%, less than or equal to 15%, or less than or equal to 10%. Non-limiting materials for the seal include silicone (e.g., liquid silicone rubber), polysulfide, polyurethane, thermoplastic vulcanizate, thermoplastic elastomers (styrenic block copolymer (SBC), thermoplastic polyolefin (TPO), thermoplastic polyurethane (TPU), and the like), and the like.

As shown in FIGS. 3A and 3B, an outer surface of the seal 191 is exposed around the entire circumference of the seal groove 189. A diameter of the seal 191 is greater than a diameter of the inner segment 188A and the outer segment 188B such that it radially extends beyond the surface of the inner segment 188A and the outer segment 188B.

Figure 3C:
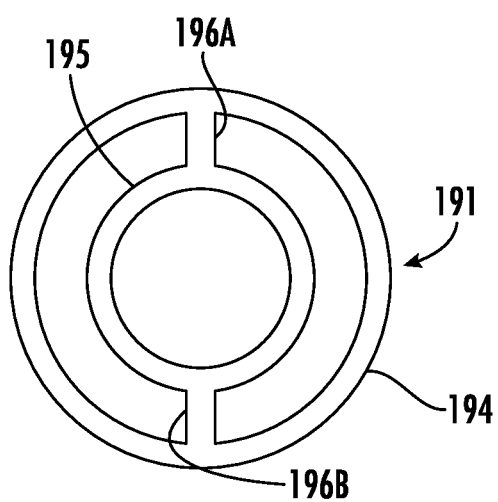
FIG. 3C is a side view of an example seal according to one or more embodiments described and illustrated herein.

Not only is the seal 191 disposed within the seal groove 189, it is also disposed along an interior surface 192 of the passageway 183 as shown in FIG. 3B. Further, the seal 191 is disposed within the one or more openings (e.g., first and second openings 190A, 190B). FIG. 3C illustrates a side view of the example seal 191 shown in FIGS. 3A and 3B. The example seal 191 includes an outer ring 194 and an inner ring 195, which are connected by a first connecting segment 196A and a second connecting segment 196B. More or fewer connecting segments may be provided, as well as in differing orientations, depending on the shape of the body of the cable adapter 180.

The outer ring 194 is disposed within the seal groove 189 of the body of the cable adapter 180. The connecting first and second connecting segments 196A, 196B are disposed within the first and second openings 190A, 190B, respectively. The inner ring 195 is disposed within the passageway 183 and is adjacent the interior surface 192.

The cable adapter 180 may be fabricated by a multi-step molding process. The body of the cable adapter 180 is fabricated by a first molding process using a first mold. The first molding process may be any known or yet-to-be-developed molding process. The seal 191 is formed by a second molding process. The second molding process may be an overmolding process wherein the sealing material is disposed within the seal groove 189. A mold insert (not shown) having a shape and size similar to an optical cable is provided within the passageway 183. In some embodiments, the mold insert has a shallow groove that maintains the sealing material so that the inner ring 195 has a defined width within the passageway 183. During the second molding process, the sealing material is disposed within the sealing groove, and flows within the first and second openings 190A, 190B to enter the passageway 183. The mold insert prevents the sealing material from fully entering the passageway 183 and defines an inner diameter for the seal 191 so that it can accept an optical cable during optical cable assembly fabrication. After the sealing material has cured, the mold insert is removed from the passageway 183 and a seal 191 is formed as shown in FIGS. 3A-3C.

Figure 4:
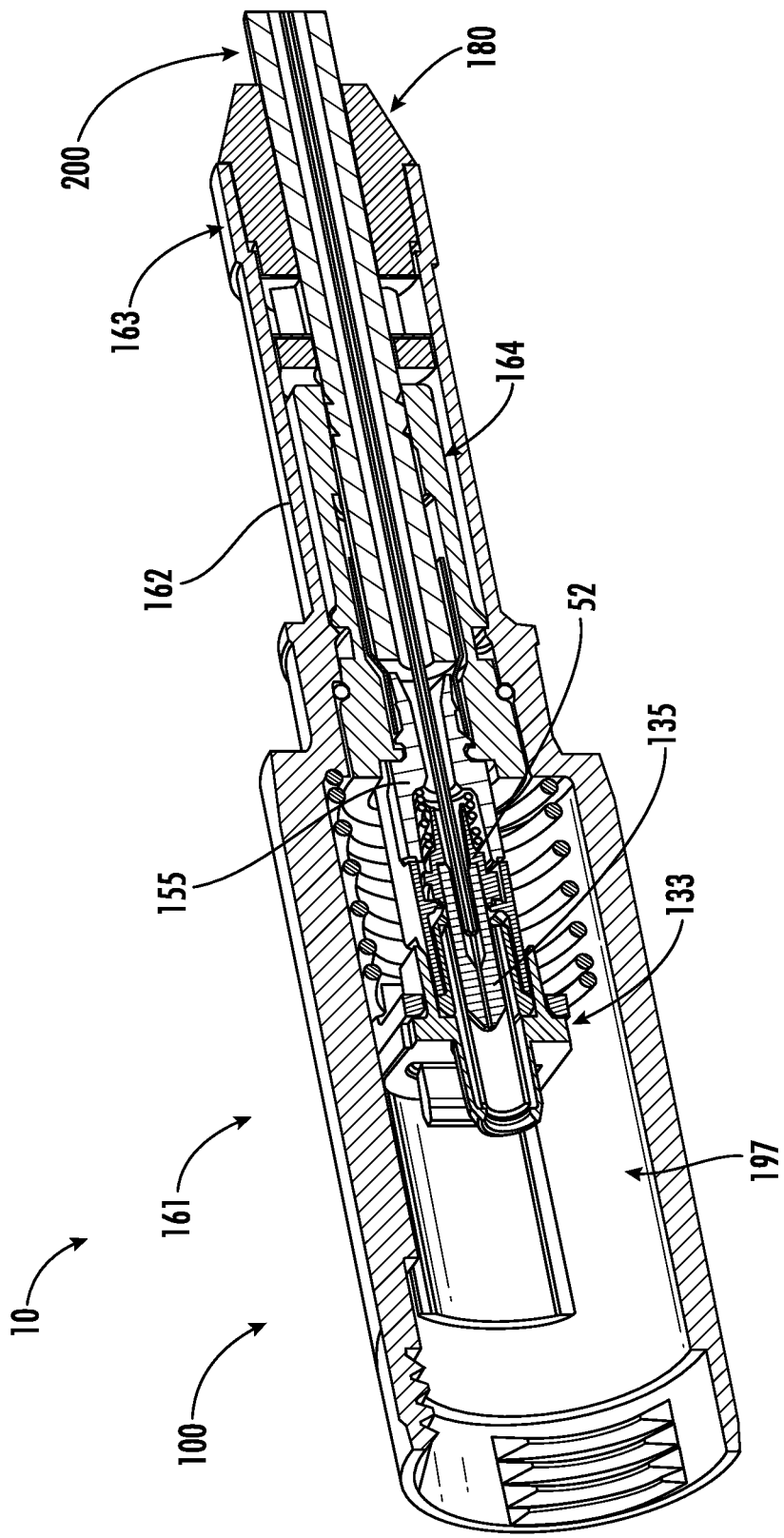
FIG. 4 is a cross-sectional perspective view of an example optical cable assembly according to one or more embodiments described and illustrated herein.
Figure 5:
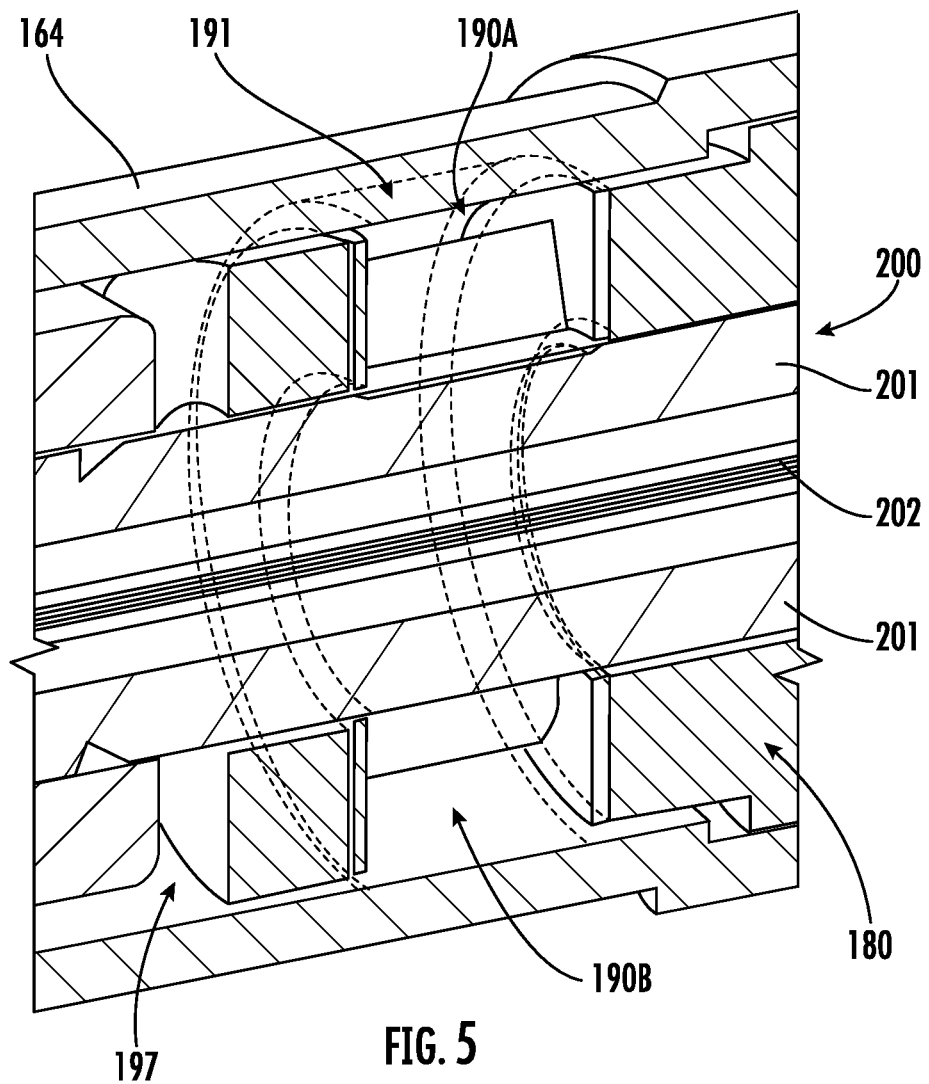
FIG. 5 is a close-up view of an example cable adapter of the optical assembly shown in FIG. 4.

After the seal 191 is formed, the cable adapter 180 is ready to be installed over an optical cable (or other type of cable). FIG. 4 shows a partial cross-sectional, perspective view of an optical cable assembly 10 comprising the optical connector 100 of FIG. 1 connected to an optical cable 200. FIG. 5 illustrates a close-up view of the cable adapter 180, the optical cable 200, and the female coupling housing 164 shown in FIG. 4. Referring to both FIGS. 4 and 5, the optical cable 200 has a jacket 201 that surrounds at least one optical fiber 202. The optical cable 200 is disposed within the passageway 183 of the cable adapter 180 such that the outer surface of the jacket 201 contacts the inner surface of the seal 191. The seal 191 is compressed between the jacket 201 and the inner surface of the seal groove 189, thereby establishing a seal between the optical cable 200 and the cable adapter 180.

The cable adapter 180 and the optical cable 200 are inserted into the female coupling housing 164 of the optical connector 100. The outer surface of the seal 191 contacts the inner surface of a passageway 197 of the female coupling housing 164. The seal 191 is compressed between the outer surface of the seal groove 189 and the inner surface of the female coupling housing 164, thereby establishing a seal between cable adapter 180 and the female coupling housing 164.

Thus, the seal 191 seals the optical connector 100 with respect to the optical cable 200 without the use of a heat shrink tube.

Figure 6A:
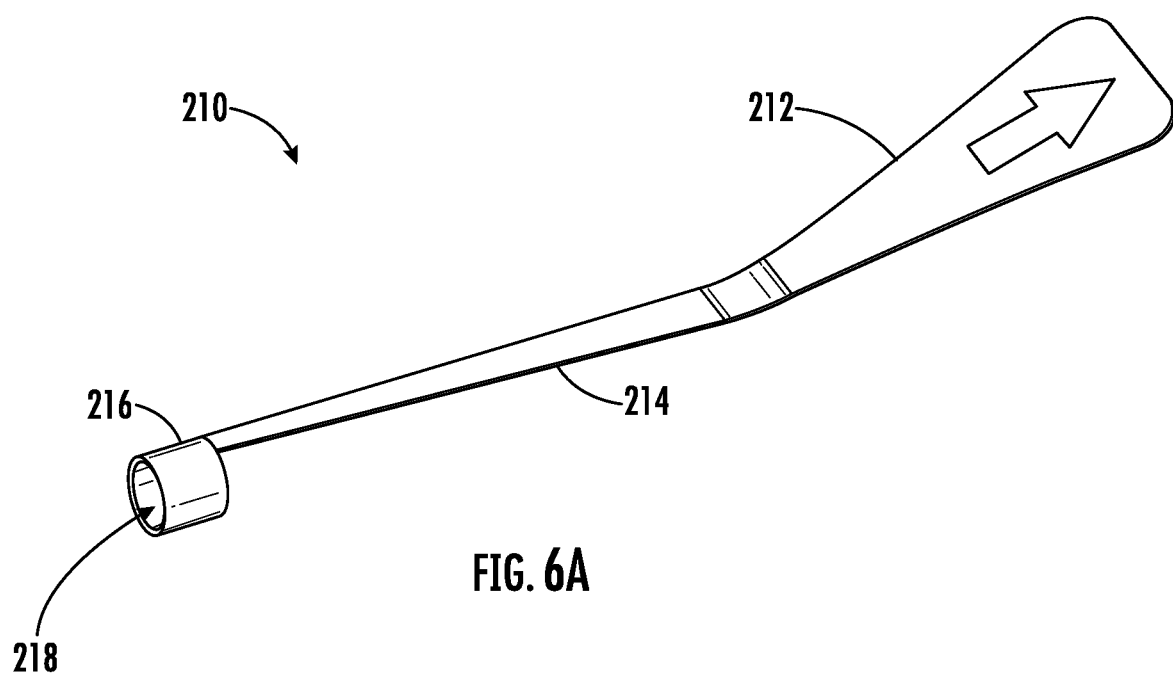
FIG. 6A is a perspective view of an example slip device according to one or more embodiments described and illustrated herein.

The friction between the seal 191 and the optical cable 200 may make it difficult to slide the cable adapter 180 over the optical cable. In some embodiments, a slip device is used to aid in installing the cable adapter 180 over the optical cable 200. Referring now to FIG. 6A, a non-limiting example of a slip device 210 is illustrated. The example slip device 210 comprises a cable receiving portion 216, a pull tab 212, and a stem 214 connecting the cable receiving portion 216 and the pull tab 212. It should be understood that embodiments are not limited to the shape and configuration of the slip device 210 shown in FIG. 6A.

Figure 6B:
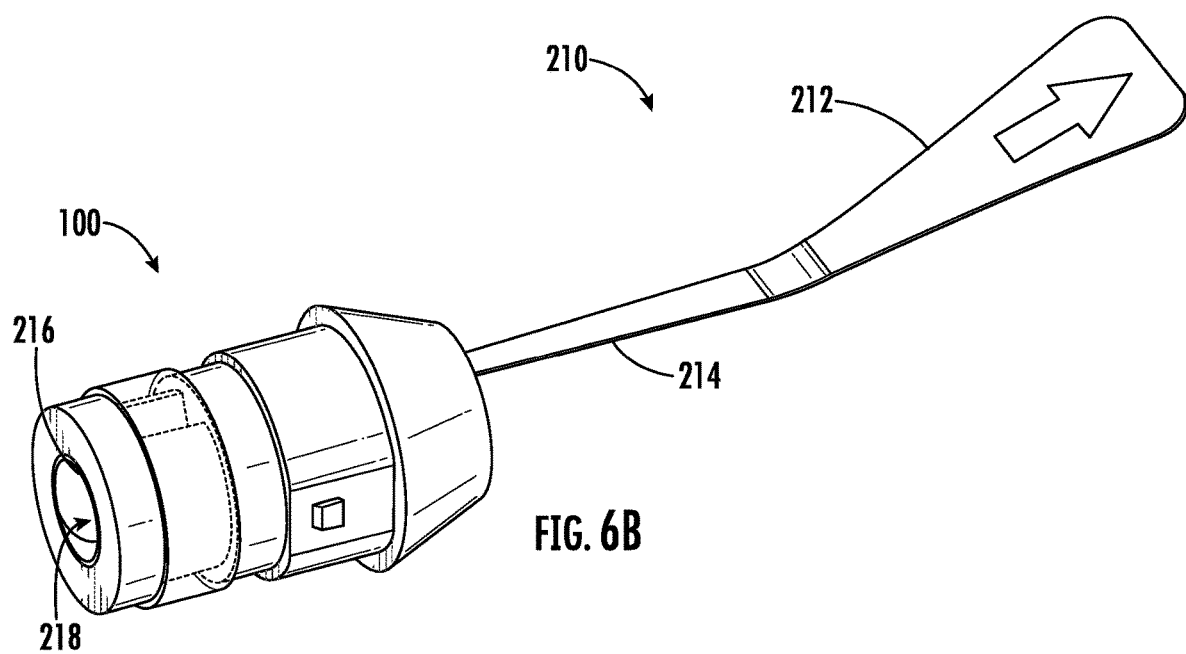
FIG. 6B is a perspective view of the example slip device inserted into the cable adapter depicted in FIGS. 2A, 2B, 3A, and 3B according to one or more embodiments described and illustrated herein.

The cable receiving portion 216 includes a passageway 218 through which an optical cable 200 may be positioned. Referring now to FIG. 6B, the cable receiving portion 216 is disposed within the passageway 183 of the cable adapter 180 such that it is adjacent to the seal 191. The optical cable 200 is positioned through the passageway 183 of the cable adapter 180 and the passageway 218 of the cable receiving portion 216. The cable receiving portion 216 may be made of a low friction material so that it is easily removed from the cable adapter 180 after insertion of the optical cable 200. After the cable adapter 180 and the slip device 210 are disposed over the optical cable 200, the slip device 210 is removed from the cable adapter 180 by pulling the pull tab of the slip device 210 in a direction away from the cable adapter 180. Removal of the slip device 210 from the cable adapter 180 causes the inner surface of the seal 191 to be adjacent to the jacket 201, thereby forming a seal between the cable adapter 180 and the optical cable 200 as described above.

It should now be understood that the cable adapters with an integral seal described herein seal hardened optical cable assemblies without a heat shrink tube assembly. However, embodiments may also incorporate a heat shrink tube in addition to the seals described herein. Integration of a seal into the cable adapter reduces manufacturing complexity and cost because the heat application stage may be removed from the manufacturing process. Further, the integral seal lowers the manufacturing variation, and increases yield because leakage paths due to variation in heat shrink tube activation and heat shrink material reflow is removed from the manufacturing process.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. A method of fabricating an optical cable adapter, the method comprising:
   forming, by a first molding process, a cable adapter comprising:
      a first end;
      a second end;
      a passageway extending between the first end and the second end;
      a seal groove within a surface of the second end; and
      at least one opening within the seal groove, wherein the at least one opening is fluidly coupled to the passageway; and
   forming, by a second molding process, a seal within the seal groove, wherein the seal comprises a sealing material disposed within the seal groove, the at least one opening, and along an interior surface of the passageway.

2. The method of claim 1, wherein the at least one opening comprises a first opening and a second opening.

3. The method of claim 1, wherein the seal comprises an inner ring within the passageway and an outer ring within the seal groove, and the inner ring is concentric with the outer ring.

4. The method of claim 3, wherein the inner ring is connected to the outer ring by at least one connecting segment through the at least one opening.

5. The method of claim 1, wherein the cable adapter further comprises a middle segment, wherein the middle segment comprises a keyed surface.

6. The method of claim 5, wherein the cable adapter further comprises an engagement feature extending from the keyed surface.

7. The method of claim 1, wherein the seal has a hardness of less than or equal to Shore A 40 and a compression set that is less than or equal to 20%.

8. The method of claim 1, further comprising installing a slip device into the passageway, the slip device comprising a pull tab and a cable receiving portion, wherein the cable receiving portion is installed within the passageway such that it is adjacent an inner surface of the seal.

9. A method of fabricating an optical cable assembly, the method comprising:
   positioning an optical cable comprising a jacket surrounding at least one optical fiber within a passageway of a cable adapter, wherein the cable adapter comprises a first end;

a second end, wherein the passageway extends between the first end and the second end;

a seal groove within a surface of the second end; and at least one opening within the seal groove, wherein the at least one opening is fluidly coupled to the passageway;

a seal within the seal groove, wherein the seal comprises a sealing material disposed within the seal groove, the at least one opening, and along an interior surface of the passageway; and a slip device comprising a pull tab and a cable receiving portion, wherein:

the cable receiving portion is disposed within the passageway and is adjacent an inner surface of the seal; and the optical cable is positioned within the passageway such that the cable receiving portion is between a jacket of the optical cable and the inner surface of the seal; and pulling the pull tab of the slip device in a direction away from the cable adapter to remove the slip device from the cable adapter, thereby causing the inner surface of the seal to be adjacent to the jacket of the optical cable.

10. The method of claim 9, wherein the at least one opening comprises a first opening and a second opening.

11. The method of claim 9, wherein the seal comprises an inner ring within the passageway and an outer ring within the seal groove, and the inner ring is concentric with the outer ring.

12. The method of claim 11, wherein the inner ring is connected to the outer ring by at least one connecting segment through the at least one opening.

13. The method of claim 9, wherein the cable adapter further comprises a middle segment, and the middle segment comprises a keyed surface.

14. The method of claim 13, wherein the cable adapter further comprises an engagement feature extending from the keyed surface.

15. The method of claim 9, wherein the seal has a hardness of less than or equal to Shore A 40 and a compression set that is less than or equal to 20%.

* * * * *